Patented Dec. 21, 1937

2,102,697

UNITED STATES PATENT OFFICE 2,102,697

METHOD FOR THE DEHYDRATION OF NITROCELLULOSE AND TO THE PRODUCT THEREOF

Walter E. Gloor, Kennett Square, Pa., assignor to Hercules Powder Company, Wilmington, Del., a corporation of Delaware No Drawing. Application July 8, 1936, Serial No. 89,651

19 Claims. (Cl. 260—148)

My invention relates to a novel method for the dehydration of nitrocellulose and to the product thereof.

It is well known that nitrocellulose as usually produced is wet with water since in a dry state it is highly inflammable and unsafe to handle, store and ship. It is equally well known to effect dehydration or removal of water from nitrocellulose by first subjecting it to mechanical treatment, as centrifugation, and then to treatment with a dehydrating agent, generally ethyl alcohol, a quantity of which is permitted to remain with the nitrocellulose to maintain it wet for the promotion of safety in handling, storage and shipment.

The use of ethyl alcohol as a dehydrating agent for nitrocellulose is, however, disadvantageous in many cases, due to its low boiling point and its miscibility with water. The low boiling point is frequently undesirable in that it evaporates from the nitrocellulose during storage, changing the percentage composition of the mixture and even leaving the nitrocellulose in a dangerously dry condition. Furthermore, the low boiling point is undesirable where it is desired to formulate high boiling lacquer solutions. The free water miscibility is frequently undesirable in that the dehydrated nitrocellulose contains an appreciable percentage of water, which tends to cause corrosion of metal storage containers. Water is also present in lacquers made from nitrocellulose dehydrated with ethyl alcohol, and causes the lacquer to have a tendency to corrode metal storage containers. The presence of water in lacquer also tends to cause it to dry to a rough film.

The use of nitrocellulose wet with ethyl alcohol has a serious disadvantage in the production of lacquer base solutions for use in the production of nitrocellulose emulsions. The low boiling point of ethyl alcohol is a disadvantage in formulating the high boiling solvent mixtures necessary in nitrocellulose emulsions for certain applications. Furthermore, in a nitrocellulose emulsion, the complete miscibility of ethyl alcohol in water allows ethyl alcohol to be leached from the lacquer phase to the water phase of the emulsion. In many cases this is highly undesirable.

The art has realized the disadvantages in the use of ethyl alcohol in dehydrating nitrocellulose and the use of higher boiling and less water miscible alcohols have been disclosed for this purpose. Amyl alcohol, disclosed by Arthur Langmeier in U. S. Patent 1,901,561, is the least water-miscible and highest boiling alcohol which has been used by the prior art. The use of amyl alcohol, however, does not obviate the objections to the use of ethyl alcohol.

The use of less water-miscible liquids than amyl alcohol has been considered impractical for the dehydration of nitrocellulose, since it has been considered that the liquid used for dehydration must be sufficiently miscible to dissolve the water contained in the nitrocellulose. Obviously, if this is true a completely water-immiscible liquid would not dehydrate nitro cellulose, and the less water-miscible a liquid is, the more would be required to remove a given quantity of water from nitrocellulose. Xylol, gasoline, and similar water-immiscible liquids have been tested from time to time in the percolation process for the dehydration of nitrocellulose, but have always been found practically useless for the purpose. This was attributed to their water-immiscibility.

Now, I have found, surprisingly enough, that I can effectively dehydrate nitrocellulose with aliphatic alcohols which contain six or more carbon atoms and which are liquids at room temperatures or at the slightly elevated temperatures which can be used for dehydration, without using the enormous excess which would be necessary to dissolve the water retained in damp nitrocellulose. Such alcohols appear to dehydrate damp nitrocellulose by selectively wetting the nitrocellulose fibers and thus displacing the water therefrom. After the water has been displaced from the surfaces of the nitrocellulose fibers, it can be readily swept out of the fibrous mass by the use of a slight excess of the alcohol, or by other convenient procedure.

I may use monohydric aliphatic alcohols containing not less than six and not more than twelve carbon atoms, such as, for example, hexyl alcohol, heptyl alcohol, octyl alcohol, lauryl alcohol, and the corresponding isomeric alcohols, mixtures thereof, etc. I may also use commercial mixtures of these alcohols. For example, I may use the commercial mixture of alcohols obtained by hydrogenating cocoanut oil fatty acids, which is largely lauryl alcohol. Such alcohols will dissolve much less water than amyl alcohol and other alcohols used heretofore and nitrocellulose dehydrated with them contain only very small percentages of water. Furthermore, such alcohols are less soluble in water than amyl alcohol and the other alcohols used heretofore, and for that reason nitrocellulose dehydrated with such alcohols is particularly useful in the production of nitrocellulose emulsions.

By the process in accordance with my invention, fibrous nitrocellulose which has been washed free of nitrating acids and which contains a large quantity of water is subjected to mechanical treatment to effect the removal of the loosely held water. Thus, the wet nitrocellulose may, for example, be pressed or centrifuged. After such treatment the nitrocellulose still contains a certain amount of residual water which clings very tenaciously to the nitrocellulose fibers and can not be removed by mechanical treatment. The damp nitrocellulose is then treated with a monohydric aliphatic alcohol containing not less than six and not more than twelve carbon atoms, in amount greater than the amount of water retained in the damp nitrocellulose at a temperature above the melting point of the alcohol, and a mixture of the alcohol and water removed from the nitrocellulose, as, for example, by distillation or by mechanical treatment, leaving the nitrocellulose uniformly wet throughout with the alcohol and substantially free of water. The nitrocellulose will be in the fibrous condition and each fiber will be wet with alcohol.

More specifically, fibrous nitrocellulose which has been washed free of nitrating acids and which contains a large quantity of water may be pressed or centrifuged to remove the loosely held water, and then an alcohol, such as, for example, hexyl alcohol, heptyl alcohol, octyl alcohol, lauryl alcohol, etc., in amount greater than the amount of water retained by the damp nitrocellulose percolated through the damp nitrocellulose. The nitrocellulose containing both water and the alcohol may then be pressed or centrifuged to remove the water and a part of the alcohol, leaving the fibrous nitrocellulose uniformly wet with the alcohol and substantially free of water. The amount of alcohol retained by the nitrocellulose may be adjusted by the pressure applied to the nitrocellulose, or by speed at which it is centrifuged.

In following this embodiment of my invention, I use an amount of an alcohol containing six or more carbon atoms greater than the amount of water contained in the damp nitrocellulose. However, the amount of such an alcohol added to secure efficient dehydration need not be sufficient to dissolve all the water contained in the damp nitrocellulose. The alcohol appears to displace the water from the nitrocellulose, so that such displaced water drains out of the nitrocellulose along with the excess alcohol as a two phase mixture, leaving only the very small amount of water actually dissolved in the alcohol on the nitrocellulose fiber.

Alternately, the nitrocellulose containing both water and the alcohol may be subjected to distillation under reduced pressure to remove the water and as much of the alcohol as may be desired, to leave the nitrocellulose uniformly wet with alcohol. In following this alternate embodiment of my invention, the temperature will desirably not be allowed to exceed about 75° C. during the distillation.

The product in accordance with this invention is fibrous nitrocellulose uniformly wet with a monohydric aliphatic alcohol containing not less than six carbon atoms and not more than twelve carbon atoms and which will dissolve substantially less water than amyl alcohol. Such nitrocellulose may contain from about 20% by weight to about 50% by weight of the alcohol, and will desirably contain from about 25% by weight to about 35% by weight.

The dehydrated nitrocellulose produced in accordance with this invention will be found to be particularly advantageous in that it has little tendency to corrode metal containers on long storage, due to the very low water content. It is comparatively non-inflammable and maintains its uniformly wetted condition over long periods, so that the hazard involved in storage is small. This product is particularly suited for the formulation of lacquers, printing inks, etc., for which substantially water-free high-boiling solvent mixtures are desired. This product is also particularly suitable for the production of lacquer solutions for emulsification in water in which, in many cases, require highly water-immiscible solvent mixtures. This product is also particularly suitable for use in the production of lacquer emulsions in that the higher aliphatic alcohol contained as a wetting agent improves the stability of the lacquer emulsion when present in the solvent mixture of the lacquer phase.

What I claim and desire to protect by Letters Patent is:

1. The method of treating nitrocellulose, which comprises treating nitrocellulose damp with water with a monohydric aliphatic alcohol containing not less than six carbon atoms and not more than twelve carbon atoms in liquid phase and in amount greater than the amount of water present in the nitrocellulose and removing a mixture of the alcohol and water from the nitrocellulose.

2. The method of treating nitrocellulose, which comprises treating nitrocellulose damp with water with a monohydric aliphatic alcohol containing not less than six carbon atoms and not more than twelve carbon atoms in liquid phase and in amount greater than the amount of water present in the nitrocellulose and removing a mixture of alcohol and water from the nitrocellulose by mechanical treatment.

3. The method of treating nitrocellulose, which comprises treating nitrocellulose damp with water with a monohydric aliphatic alcohol containing not less than six carbon atoms and not more than twelve carbon atoms in liquid phase and in amount greater than the amount of water present in the nitrocellulose and removing a mixture of alcohol and water from the nitrocellulose by the application of pressure.

4. The method of treating nitrocellulose, which comprises treating nitrocellulose damp with water with a monohydric aliphatic alcohol containing not less than six carbon atoms and not more than twelve carbon atoms in liquid phase and in amount greater than the amount of water present in the nitrocellulose and removing in a mixture of alcohol and water from the nitrocellulose by centrifuging.

5. The method of treating nitrocellulose, which comprises treating nitrocellulose damp with water with a monohydric aliphatic alcohol containing not less than six carbon atoms and not more than twelve carbon atoms in liquid phase and in amount greater than the amount of water present in the nitrocellulose and removing a mixture of alcohol and water from the nitrocellulose by distillation under vacuum.

6. Nitrocellulose in fibrous form containing from about 20% to about 50% of a monohydric aliphatic alcohol containing not less than six carbon atoms and not more than twelve carbon atoms substantially uniformly distributed throughout the mass.

7. Nitrocellulose in fibrous form wet with a monohydric aliphatic alcohol containing not less than six carbon atoms and not more than twelve carbon atoms, the nitrocellulose being substantially free of water.

8. Nitrocellulose in fibrous form wet with hexyl alcohol, the nitrocellulose being substantially free of water.

9. Nitrocellulose in fibrous form wet with octyl alcohol, the nitrocellulose being substantially free of water.

10. Nitrocellulose in fibrous form wet with lauryl alcohol, the nitrocellulose being substantially free of water.

11. The method of treating nitrocellulose which comprises treating nitrocellulose damp with water with hexyl alcohol in liquid phase and in amount greater than the amount of water present in the nitrocellulose and removing a mixture of the alcohol and water from the nitrocellulose.

12. The method of treating nitrocellulose which comprises treating nitrocellulose damp with water with octyl alcohol in liquid phase and in amount greater than the amount of water present in the nitrocellulose and removing a mixture of the alcohol and water from the nitrocellulose.

13. The method of treating nitrocellulose which comprises treating nitrocellulose damp with water with lauryl alcohol in liquid phase and in amount greater than the amount of water present in the nitrocellulose and removing a mixture of the alcohol and water from the nitrocellulose.

14. The method of treating nitrocellulose which comprises treating nitrocellulose damp with water with hexyl alcohol in liquid phase and in amount greater than the amount of water present in the nitrocellulose and removing a mixture of the alcohol and water from the nitrocellulose by the application of pressure.

15. The method of treating nitrocellulose which comprises treating nitrocellulose damp with water with octyl alcohol in liquid phase and in amount greater than the amount of water present in the nitrocellulose and removing a mixture of the alcohol and water from the nitrocellulose by the application of pressure.

16. The method of treating nitrocellulose which comprises treating nitrocellulose damp with water with lauryl alcohol in liquid phase and in amount greater than the amount of water present in the nitrocellulose and removing a mixture of the alcohol and water from the nitrocellulose by the application of pressure.

17. Nitrocellulose in fibrous form containing from about 20% to about 50% of hexyl alcohol substantially uniformly distributed throughout the mass.

18. Nitrocellulose in fibrous form containing from about 20% to about 50% of octyl alcohol substantially uniformly distributed throughout the mass.

19. Nitrocellulose in fibrous form containing from about 20% to about 50% of lauryl alcohol substantially uniformly distributed throughout the mass.

WALTER E. GLOOR.

CERTIFICATE OF CORRECTION.

Patent No. 2,102,697.　　　　　　　　　　　　　　December 21, 1937.

WALTER E. GLOOR.

It is hereby certified that error appears in the printed specification of the above numbered patent requiring correction as follows: Page 2, second column, line 57, claim 4, strike out the word "in" second occurrence; and that the said Letters Patent should be read with this correction therein that the same may conform to the record of the case in the Patent Office.

Signed and sealed this 8th day of February, A. D. 1938.

Henry Van Arsdale
Acting Commissioner of Patents.

(Seal)

monohydric aliphatic alcohol containing not less than six carbon atoms and not more than twelve carbon atoms, the nitrocellulose being substantially free of water.

8. Nitrocellulose in fibrous form wet with hexyl alcohol, the nitrocellulose being substantially free of water.

9. Nitrocellulose in fibrous form wet with octyl alcohol, the nitrocellulose being substantially free of water.

10. Nitrocellulose in fibrous form wet with lauryl alcohol, the nitrocellulose being substantially free of water.

11. The method of treating nitrocellulose which comprises treating nitrocellulose damp with water with hexyl alcohol in liquid phase and in amount greater than the amount of water present in the nitrocellulose and removing a mixture of the alcohol and water from the nitrocellulose.

12. The method of treating nitrocellulose which comprises treating nitrocellulose damp with water with octyl alcohol in liquid phase and in amount greater than the amount of water present in the nitrocellulose and removing a mixture of the alcohol and water from the nitrocellulose.

13. The method of treating nitrocellulose which comprises treating nitrocellulose damp with water with lauryl alcohol in liquid phase and in amount greater than the amount of water present in the nitrocellulose and removing a mixture of the alcohol and water from the nitrocellulose.

14. The method of treating nitrocellulose which comprises treating nitrocellulose damp with water with hexyl alcohol in liquid phase and in amount greater than the amount of water present in the nitrocellulose and removing a mixture of the alcohol and water from the nitrocellulose by the application of pressure.

15. The method of treating nitrocellulose which comprises treating nitrocellulose damp with water with octyl alcohol in liquid phase and in amount greater than the amount of water present in the nitrocellulose and removing a mixture of the alcohol and water from the nitrocellulose by the application of pressure.

16. The method of treating nitrocellulose which comprises treating nitrocellulose damp with water with lauryl alcohol in liquid phase and in amount greater than the amount of water present in the nitrocellulose and removing a mixture of the alcohol and water from the nitrocellulose by the application of pressure.

17. Nitrocellulose in fibrous form containing from about 20% to about 50% of hexyl alcohol substantially uniformly distributed throughout the mass.

18. Nitrocellulose in fibrous form containing from about 20% to about 50% of octyl alcohol substantially uniformly distributed throughout the mass.

19. Nitrocellulose in fibrous form containing from about 20% to about 50% of lauryl alcohol substantially uniformly distributed throughout the mass.

WALTER E. GLOOR.

CERTIFICATE OF CORRECTION.

Patent No. 2,102,697.   December 21, 1937.

WALTER E. GLOOR.

It is hereby certified that error appears in the printed specification of the above numbered patent requiring correction as follows: Page 2, second column, line 57, claim 4, strike out the word "in" second occurrence; and that the said Letters Patent should be read with this correction therein that the same may conform to the record of the case in the Patent Office.

Signed and sealed this 8th day of February, A. D. 1938.

Henry Van Arsdale
Acting Commissioner of Patents.

(Seal)

CERTIFICATE OF CORRECTION.

Patent No. 2,102,697. December 21, 1937.

WALTER E. GLOOR.

It is hereby certified that error appears in the printed specification of the above numbered patent requiring correction as follows: Page 2, second column, line 57, claim 4, strike out the word "in" second occurrence; and that the said Letters Patent should be read with this correction therein that the same may conform to the record of the case in the Patent Office.

Signed and sealed this 8th day of February, A. D. 1938.

(Seal)

Henry Van Arsdale
Acting Commissioner of Patents.